United States Patent
Takeuchi

(10) Patent No.: US 10,686,989 B2
(45) Date of Patent: Jun. 16, 2020

(54) IMAGE STABILIZATION APPARATUS, IMAGE CAPTURING SYSTEM, AND METHOD FOR CONTROLLING THE SAME

(71) Applicant: CANON KABUSHIKI KAISHA, Tokyo (JP)

(72) Inventor: Kenji Takeuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/266,221

(22) Filed: Feb. 4, 2019

(65) Prior Publication Data
US 2019/0246039 A1  Aug. 8, 2019

(30) Foreign Application Priority Data
Feb. 7, 2018 (JP) .................. 2018-020332

(51) Int. Cl.
    *H04N 5/232* (2006.01)
    *H04N 5/225* (2006.01)
    *G02B 27/64* (2006.01)

(52) U.S. Cl.
    CPC ....... *H04N 5/23267* (2013.01); *G02B 27/646* (2013.01); *H04N 5/23209* (2013.01)

(58) Field of Classification Search
    CPC ............. G02B 27/646; H04N 5/23258; H04N 5/23287; H04N 5/23267; H04N 5/23209
    See application file for complete search history.

(56) References Cited

U.S. PATENT DOCUMENTS

| 2015/0097977 | A1  | 4/2015  | Watanabe |
|---|---|---|---|
| 2015/0281581 | A1* | 10/2015 | Sakurai .............. H04N 5/23287 348/208.2 |
| 2016/0205325 | A1* | 7/2016  | Kawai ..................... G02B 7/02 348/208.11 |

FOREIGN PATENT DOCUMENTS

| EP | 2723064 A2    | 4/2014  |
|----|---------------|---------|
| JP | 2015-194711 A | 11/2015 |

OTHER PUBLICATIONS

The above patent documents were cited in a European Search Report dated Oct. 11, 2019, that issued in the corresponding European Patent Application No. 19153180.5.

\* cited by examiner

*Primary Examiner* — Ahmed A Berhan
(74) *Attorney, Agent, or Firm* — Cowan, Liebowitz & Latman, P.C.

(57) ABSTRACT

An image stabilization apparatus includes a shake detector configured to detect an image blur, a generation unit configured to generate a first shake correction signal and a second shake correction signal based on a shake signal corresponding to a detection result from the shake detector, the generation unit extracting a low-frequency band signal from the shake signal, changing an amplitude of the extracted low-frequency band signal to generate the first shake correction signal, and generating the second shake correction signal based on the change in the amplitude and the shake signal, a first shake correction unit configured to correct the image blur based on the first shake correction signal, and a transmission unit configured to transmit the second shake correction signal to a second image stabilization apparatus.

18 Claims, 12 Drawing Sheets

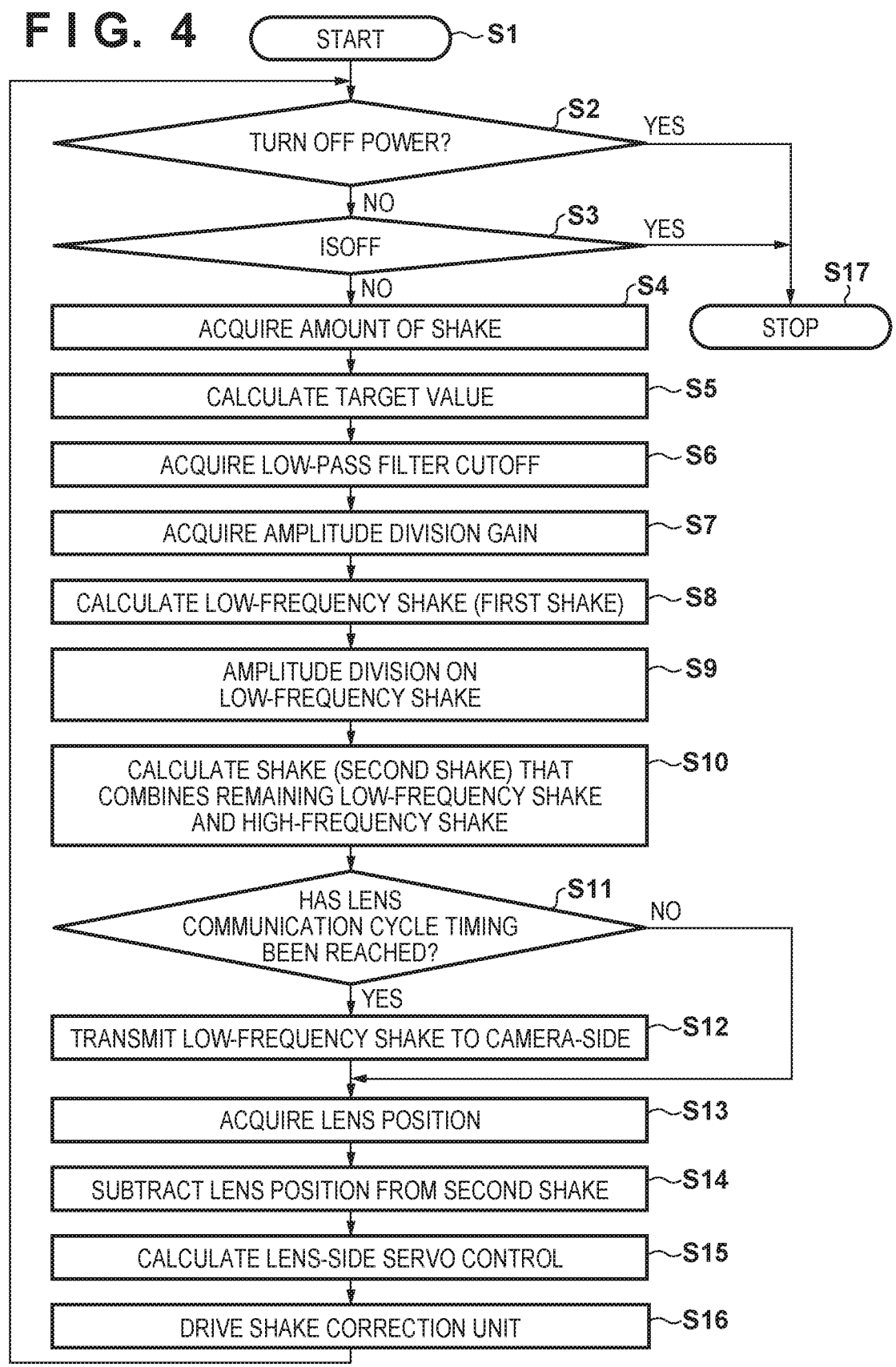

IMAGE STABILIZATION APPARATUS, IMAGE CAPTURING SYSTEM, AND METHOD FOR CONTROLLING THE SAME

BACKGROUND OF THE INVENTION

Field of the Invention

The present invention relates to an image capturing system that has an image stabilization function.

Description of the Related Art

With a decrease in size of image capturing apparatuses and an increase in the magnification of optical systems, the influence of deterioration of image quality due to shaking of an apparatus, such as a camera shake, has become increasingly significant in recent years. To address this problem, a variety of image capturing apparatuses have been proposed that have a function of correcting an image blur due to shaking of the apparatuses (hereinafter, image stabilization function).

As for interchangeable-lens cameras, cameras are proposed in which a means of detecting a shake is provided in at least one of an interchangeable lens and a camera body, and an image stabilization means is provided in at least one of the interchangeable lens and the camera body.

Japanese Patent Laid-Open No. 2015-194711 discloses an interchangeable-lens camera system that includes both a mechanism for performing image stabilization by partially decentering an imaging optical system (shake correction lens mechanism), and an image plane shake correction mechanism. In this system, information from a shake detection unit, which is provided in an interchangeable lens or a camera body, is divided into low-frequency and high-frequency shake signals, and shake correction amounts for the shake correction lens mechanism and the image plane shake correction mechanism are calculated. One of the shake correction lens mechanism and the image plane shake correction mechanism performs shake correction using a high-frequency shake correction signal, and the other one of the shake correction lens mechanism and the image plane shake correction mechanism performs shake correction using a low-frequency shake correction signal. By dividing a shake signal into a high-frequency band signal and a low-frequency band signal and performing shake correction using a plurality of shake correction means, the influence of a time delay due to communication of the shake correction amount between the interchangeable lens and the body of the interchangeable-lens camera is reduced. Furthermore, the shake correction stroke is expanded by simultaneously driving the plurality of shake correction means, and thus, an even larger shake can also be dealt with which realizes an improvement in shake correction performance.

However, depending on the characteristics of a shake occurring in an image capturing apparatus, a shake may have many low-frequency components in some cases, or may have many high-frequency components in other cases. For this reason, even with the shake correction apparatus disclosed in Japanese Patent Laid-Open No. 2015-194711, a problem may arise in that, for example, the stroke of shake correction means that deals with either low-frequency components or high-frequency components is insufficient, whereas the stroke of the other shake correction means is largely unused. That is to say, the correction stroke of the respective correction units cannot be fully utilized, resulting in a decrease in shake correction performance.

SUMMARY OF THE INVENTION

The present invention has been made in view of the foregoing problem, and provides an image stabilization apparatus capable of improving shake correction performance by efficiently utilizing the stroke of a plurality of shake correction means.

According to a first aspect of the present invention, there is provided an image stabilization apparatus for correcting an image blur in an image capturing apparatus, comprising: a shake detector configured to detect an image blur; a processor; and a memory holding a program which makes the processor function as: a generation unit configured to generate a first shake correction signal and a second shake correction signal based on a shake signal corresponding to a detection result from the shake detector, the generation unit extracting a low-frequency band signal from the shake signal, changing an amplitude of the extracted low-frequency band signal to generate the first shake correction signal, and generating the second shake correction signal based on the change in the amplitude and the shake signal; a first shake correction unit configured to correct the image blur based on the first shake correction signal; and a transmission unit configured to transmit the second shake correction signal to a second image stabilization apparatus.

According to a second aspect of the present invention, there is provided an image capturing system that includes a lens having an imaging optical system, and an image capturing apparatus to which the lens is removably attached, the image capturing system comprising: at least one shake detector configured to detect a shake of the image capturing system; a processor; and a memory holding a program which makes the processor function as: a generation unit configured to generate a first shake correction signal and a second shake correction signal based on a shake signal corresponding to a detection result from the at least one shake detector, the generation unit extracting a low-frequency hand signal from the shake signal, changing an amplitude of the extracted low-frequency band signal to generate the first shake correction signal, and generating the second shake correction signal based on the change in the amplitude and the shake signal; and first and second shake correction units configured to correct a shake of an image based respectively on the first and second shake correction signals generated by the generation unit.

According to a third aspect of the present invention, there is provided a method for controlling an image stabilization apparatus comprising: detecting a shake; generating a first shake correction signal and a second shake correction signal based on a shake signal corresponding to a detection result of the detecting of a shake, wherein a low-frequency band signal is extracted from the shake signal, an amplitude of the extracted low-frequency band signal is changed to generate the first shake correction signal, and the second shake correction signal is generated based on the change in the amplitude and the shake signal; correcting the image blur based on the second shake correction signal generated during the generating; and transmitting the first shake correction signal generated during the generating, to a second image stabilization apparatus.

According to a fourth aspect of the present invention, there is provided a method for controlling an image capturing system that includes a lens having an imaging optical system and an image capturing apparatus to which the lens is removably attached, the method comprising: detecting a shake of the image capturing system, using at least one shake detector; generating a first shake correction signal and a second shake correction signal based on a shake signal corresponding to a detection result of the detecting of a shake, wherein a low-frequency band signal is extracted from the shake signal, an amplitude of the extracted low-frequency band signal is changed to generate the first shake correction signal, and the second shake correction signal is generated based on the change in the amplitude and the shake signal; and performing first and second shake correction to correct a shake of an image based respectively on the generated first and second shake correction signals.

Further features of the present invention will become apparent from the following description of exemplary embodiments with reference to the attached drawings.

BRIEF DESCRIPTION OF THE DRAWINGS

FIG. 4 illustrates a shake correction operation sequence according to the first embodiment.

DESCRIPTION OF THE EMBODIMENTS

Hereinafter, embodiments of the present invention will be described in detail with reference to the attached drawings.

First Embodiment

Figure 1A:
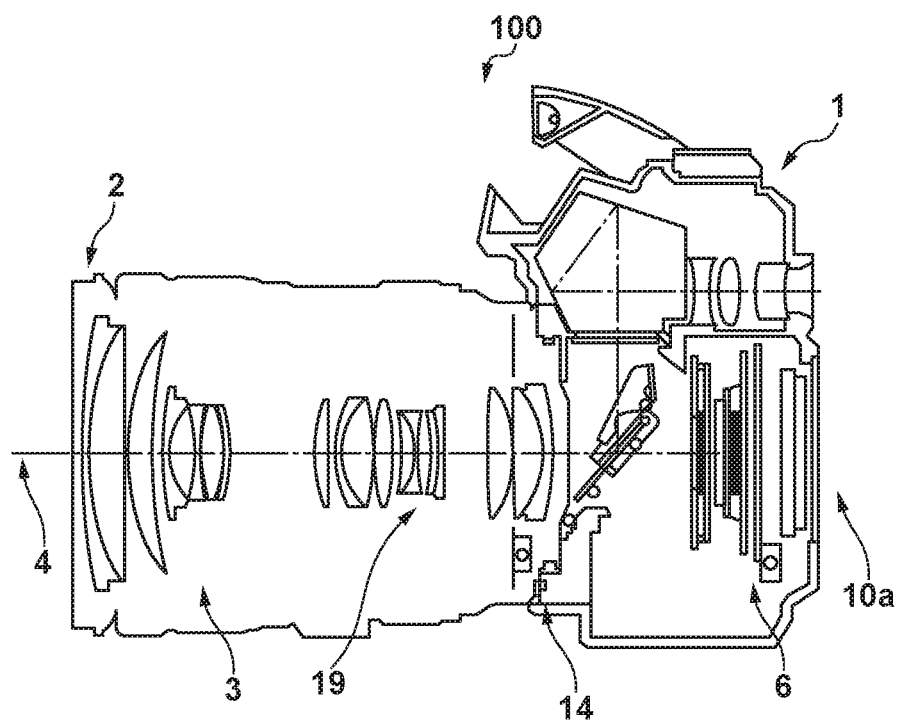
FIGS. 1A and 1B illustrate a configuration of a camera system according to a first embodiment of the present invention.

FIGS. 1A and 19 illustrate a configuration of a camera system (image capturing system) 100 of a single-lens reflex camera of an interchangeable-lens type, which serves as the first embodiment of an image capturing apparatus according to the present invention. FIG. 1A is a central cross-sectional diagram of the camera system according to the first embodiment, and FIG. 1B is a block diagram illustrating an electrical configuration of the camera system 100.

In FIG. 1A, the camera system 100 includes a camera body 1, and a lens unit 2 that is removably attached to the camera body 1. The lens unit 2 includes an imaging optical system 3, which is constituted by a plurality of lenses with an optical axis 4 serving as an axis thereof, and a shake correction unit 19 for optically correcting a shake in an image is provided as a portion of the imaging optical system 3. The shake correction unit 19 is a unit capable of shifting the optical axis, and can be constituted by a shift lens, for example. The camera body 1 also includes an image sensor unit 6 and a back display portion 10a. An electrical contact 14 for electrically connecting the camera body 1 and the lens unit 2 to each other is disposed between the camera body 1 and the lens unit 2.

Figure 1B:
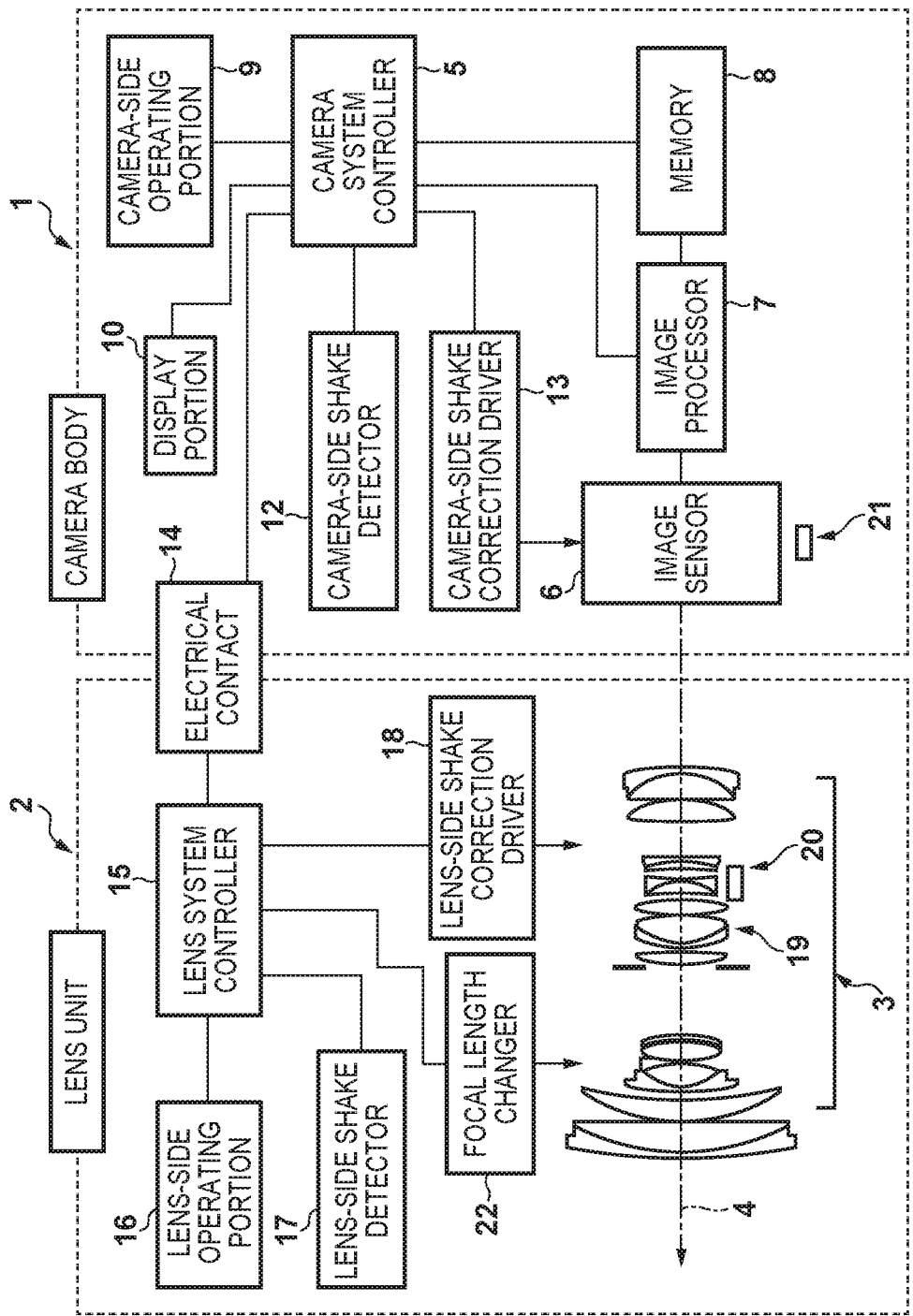

In FIG. 1B, the lens unit 2 includes, as electrical elements, a lens system controller 15, a lens-side operating portion 16, a lens-side shake detector 17, a lens-side shake correction driver 18, and a focal length changer 22. The lens system controller 15 controls the entire lens unit 2. The lens-side operating portion 16 accepts operations made by a user. The lens-side shake detector 17 detects the amount of shake of the camera system 100. The lens-side shake correction driver 18 drives the shake correction unit 19 to correct an image blur. The focal length changer 22 changes the focal length of the imaging optical system 3.

The camera body 1 includes, as electrical elements, a camera system controller 5, an image sensor unit 6, an image processor 7, a memory 8, a camera-side operating portion 9, a display portion 10 including the back display portion 10a, a camera-side shake detector 12, and a camera-side shake correction driver 13. The camera system controller 5 controls the entire camera system 100. The image sensor unit 6 has an image sensor for photoelectrically converting a subject image and outputting an image signal, and a driving mechanism for moving or tilting the image sensor in a direction perpendicular to the optical axis. The image processor 7 performs image processing that is required for the image signal output from the image sensor in the image sensor unit 6. The memory 8 temporarily stores image data. The camera-side operating portion 9 accepts user operations. The display portion 10 displays information indicating a shot image and the state of the camera, or the like. The camera-side shake detector 12 detects the amount of shake of the camera system 100. The camera-side shake correction driver 13 drives the image sensor unit 6 to move the image sensor within a plane perpendicular to the optical axis 4, and performs image stabilization.

In terms of functionality, the camera system 100, which is constituted by the camera body 1 and the lens unit 2, has an image capturing means, an image processing means, a recording/reproduction means, and a control means.

The image capturing means includes the imaging optical system 3 and the image sensor unit 6, and the image processing means includes the image processor 7. The recording/reproduction means includes the memory S and the display portion 10. Note that the display portion 10 includes the back display portion 10a, a small display panel (not shown) that is provided in an upper face of the camera body 1 and displays shooting information, and an electronic view finder (not shown), which is also called an EVF. The control means includes the camera system controller 5, the camera-side operating portion 9, the camera-side shake detector 12, the camera-side shake correction driver 13, the lens system controller 15, the lens-side operating portion 16, the lens-side shake detector 17, the lens-side shake correction driver 18, a lens position detector 20, an image sensor position detector 21, and the focal length changer 22. Note that the lens system controller 15 drives not only the shake correction unit 19, but also a focus lens and an aperture (not shown), and also performs zoom-drive.

The camera-side shake detector 12 and the lens-side shake detector 17 can detect a rotational shake relative to the optical axis 4 that occurs on the camera system 100, and is a vibrating structure gyroscope, for example. The camera-side shake correction driver 13 and the lens-side shake correction driver 18 drive the image sensor unit 6 and the shake correction unit 19, respectively, to shift or tilt in a plane perpendicular to the optical axis 4. The drivers (13, 18) may also shift the respective units (6, 19) in a direction parallel to the optical axis 4, whereas, in this embodiment, movement of these units in a direction parallel to the optical axis 4 is not considered.

The aforementioned image capturing means is an optical processing system that causes light from an object to form an image in an image plane of the image sensor via the imaging optical system 3. Information regarding a focus evaluation amount and an appropriate exposure amount can be obtained from the image sensor, and the imaging optical system 3 is adjusted based on this information. Thus, the image sensor can be exposed to an appropriate amount of object light, with a focus on the image sensor.

The image processor 7 includes an A/D converter, a white balance adjustment circuit, a gamma correction circuit, an interpolation calculation circuit, and so on, and generates images to be recorded. A color interpolation processor is included in the image processor 7, and performs color interpolation (demosaicing) processing using signals from a Bayer array to generate color images. The image processor 7 also compresses still images, moving images, sound, and so on, using a predetermined method. Furthermore, since the image processor 7 can also generate a shake detection signal based on a comparison between a plurality of images obtained from the image sensor, the camera-side shake detector 12 may be constituted by the image sensor and the image processor 7.

The memory 8 includes an actual storing portion. The camera system controller 5 causes image data to be output to the storing portion in the memory 8, and causes the display portion 10 to display an image to be presented to a user.

The camera system controller 5 generates and outputs a timing signal and so on during shooting. The camera system controller 5 controls the image capturing system, the image processing system, and the recording/reproduction system in accordance with an external operation. For example, the camera system controller 5 detects that a shutter release button (not shown) has been pressed, and controls driving of the image sensor in the image sensor unit 6, operations of the image processor 7, compression processing, and so on. Furthermore, the camera system controller 5 controls the state of each segment in the display portion 10 that displays information. The back display portion 10a may have a touch panel and function as both the display portion 10 and the camera-side operating portion 9.

Next, operations to adjust the imaging optical system will be described. The image processor 7 is connected to the camera system controller 5, and the camera system controller 5 obtains an appropriate focal position and aperture position based on signals from the image sensor provided in the image sensor unit 6 and operations made to the camera-side operating portion 9 by a photographer. The camera system controller 5 gives an instruction to the lens system controller 15 via the electrical contact 14, and the lens system controller 15 appropriately controls the focal length changer 22 and an aperture driver (not shown). Furthermore, in a mode of performing image stabilization, the camera-side shake correction driver 13 and the lens-side shake correction driver 18 are appropriately controlled based on signals obtained from the camera-side shake detector 12 and the lens-side shake detector 17, and detection information from the lens position detector 20 and the image sensor position detector 21. The image sensor unit 6 and the shake correction unit 19 each include a driving mechanism that has a magnet and a flat coil, for example. The lens position detector 20 and the image sensor position detector 21 each include a magnet and a Hall element, for example.

As a specific method of controlling image stabilization, initially, the camera system controller 5 and the lens system controller 15 receive shake signals detected by the camera-side shake detector 12 and the lens-side shake detector 17, respectively. Based on the received signals, the driving amounts of the image sensor unit 6 and the shake correction unit 19 for correcting an image blur are calculated. Then, the calculated driving amounts are transmitted as instruction values to the camera-side shake correction driver 13 and the lens-side shake correction driver 18, and feedback control is performed so that the positions detected by the lens position detector 20 and the image sensor position detector 21 follow the respective instruction values. The image sensor unit 6 and the shake correction unit 19 are thus driven.

Note that still images and moving images can be shot by controlling operations of each portion of the camera body 1 in accordance with user operations made to the camera-side operating portion 9, as mentioned above.

Figure 2A:
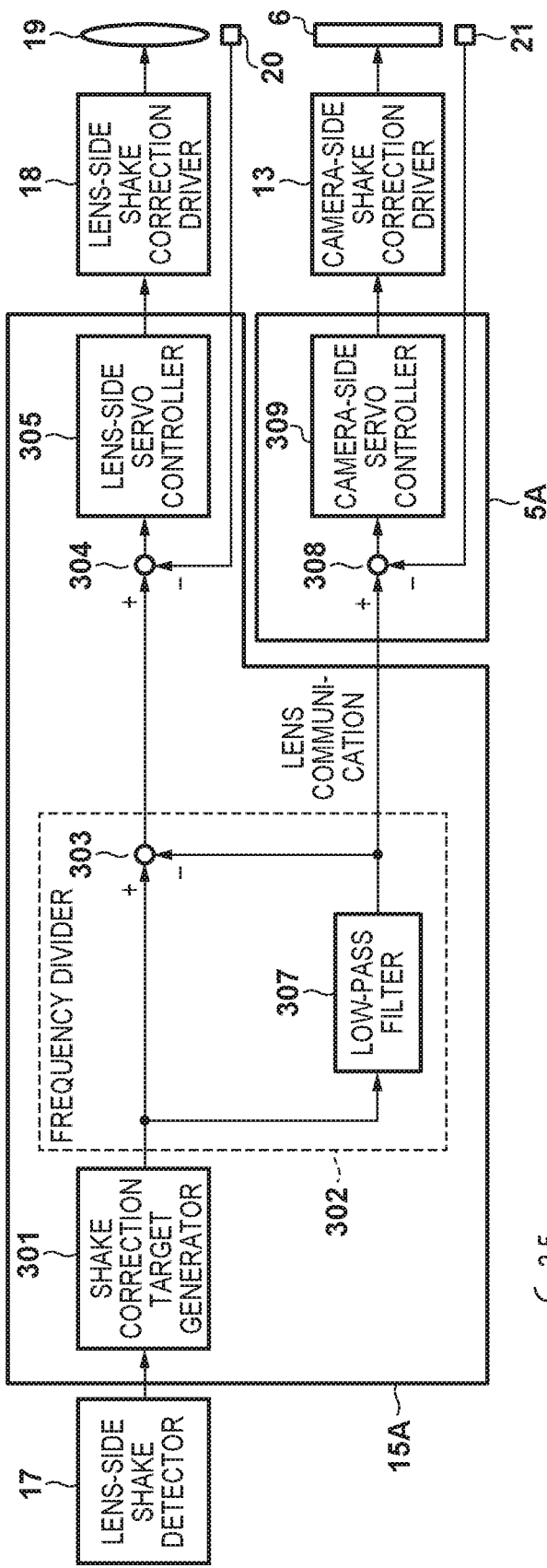
FIGS. 2A and 2B illustrate a configuration of a conventional shake correction system control unit.
Figure 2B:
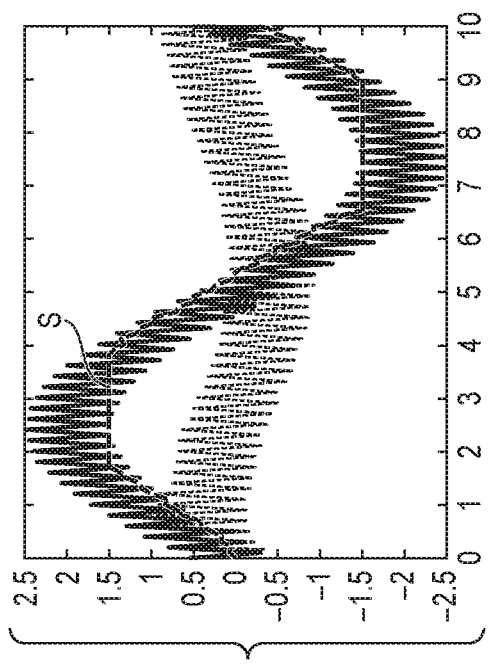

Next, problems in shake correction control using the conventional method will be described with reference to FIGS. 2A and 2B. FIG. 2A is a block diagram illustrating a configuration of a conventional camera system controller 5A and lens system controller 15A, and FIG. 2B illustrates an example of waveforms of shake correction target signals calculated using the conventional technique.

In FIG. 2A, the conventional lens system controller 15A has a shake correction target generator 301, a frequency divider 302 that is constituted by a low-pass filter 307 and an adder 303, an adder 304, and a lens-side servo controller 305. The conventional camera system controller 5A has an adder 308 and a camera-side servo controller 309.

A description will be given of shake correction processing in the conventional shake correction control system that is configured as described above. In the following description, the lens-side shake correction driver 18 and the camera-side shake correction driver 13 are controlled based on a shake signal detected by the lens-side shake detector 17 that is provided on the lens side, of the shake detectors 17 and 12 that are provided on the lens side and the camera side, respectively. In this case, since shake signal information detected by the lens-side shake detector 17 needs to be transmitted to the camera side, the information is received and delivered through communication via the electrical contact 14, with the interchangeable-lens side acting as the sender side and the camera side acting as the receiver side.

The lens system controller 15A acquires a shake signal from the lens-side shake detector 17, and causes the shake correction target generator 301 to generate a shake correction signal. The frequency divider 302 extracts a low-frequency shake correction signal from the shake correction signal using the low-pass filter 307, and also generates a high-frequency shake correction signal by subtracting the low-frequency shake correction signal from the shake correction signal using the adder 303. The lens-side servo controller 305 generates a drive signal for operating the lens-side shake correction driver 18, based on a signal obtained by subtracting position information given by the lens position detector 20 from the high-frequency shake correction signal using the adder 304. Thus, a high-frequency shake in the shake detected by the lens-side shake detector 17 is corrected by the lens-side shake correction driver 18. Note that the lens-side servo controller 305 can be constituted by a feedback controller, such as a known PID controller.

On the other hand, the low-frequency shake correction signal extracted by the lens system controller 15A is transmitted to the camera system controller 5A through communication between the lens unit 2 side and the camera body 1 side via the electrical contact 14. The camera system controller 5A causes the camera-side servo controller 309 to generate a signal for operating the camera-side shake correction driver 13, based on a signal obtained by subtracting, using the adder 308, position information given by the image sensor position detector 21 from the low-frequency shake correction signal from the lens unit 2 side. Thus, a low-frequency shake in the shake detected by the lens-side shake detector 17 is corrected by the camera-side shake correction driver 13. Note that the camera-side servo controller 309 can be constituted by a feedback controller, such as a known PID controller. As described above, the lens-side shake correction driver 18 is driven based on high-frequency components in a detected shake, and the camera-side shake correction driver 13 is driven based on low-frequency components. A correction range can be expanded by thus having the camera and the lens separately perform shake correction.

FIG. 2B illustrates waveforms of an input shake signal (solid line) before being subjected to frequency division, a low-frequency shake signal (dotted line) indicating the shake correction amount on the camera side in the conventional technique, and a high-frequency shake signal (thin dotted line) indicating the shake correction amount on the lens side in the conventional technique. This example assumes the following conditions.

Input shake signal: a shake occurring as a result of a shake of 0.1 Hz (amplitude: 2.0 degrees) and a shake of 5 Hz (amplitude: 0.5 degrees) being superimposed on each other Cutoff frequency of the low-pass filter 307: 0.5 Hz Driving stroke of the shake correction unit 19: 1.5 degrees Driving stroke of the image sensor unit 6: 1.5 degrees In this conventional example, the largest amplitude of the input shake is ±2.0 degrees, and the total of the driving strokes of the aforementioned two shake correction means is ±3.0 degrees, and accordingly, the amplitude of the input shake can be dealt with if shake correction of the input shake is simply split fifty-fifty between the two shake correction means. However, the amplitude of the low-frequency shake signal (dotted line) in the case of performing frequency division using the conventional technique exceeds ±1.5 degrees, which corresponds to the maximum stroke of the image sensor unit 6. For this reason, it can be understood that a mechanical stroke end is reached and shake correction cannot be performed, as indicated by a flat portion of the low-frequency shake signal denoted by a sign S in FIG. 2B. On the other hand, the shake correction unit 19 that deals with the high-frequency shake signal (thin dotted line) is only driven by about ±1.0 degree or less, and the driving stroke is not fully utilized. As described above, in the conventional technique, the driving amounts of the respective correction means are generated by means of simple frequency division, and thus there are cases where the available correction strokes of the respective correction means are not fully utilized, resulting in a decrease in shake correction performance.

Figure 3A:
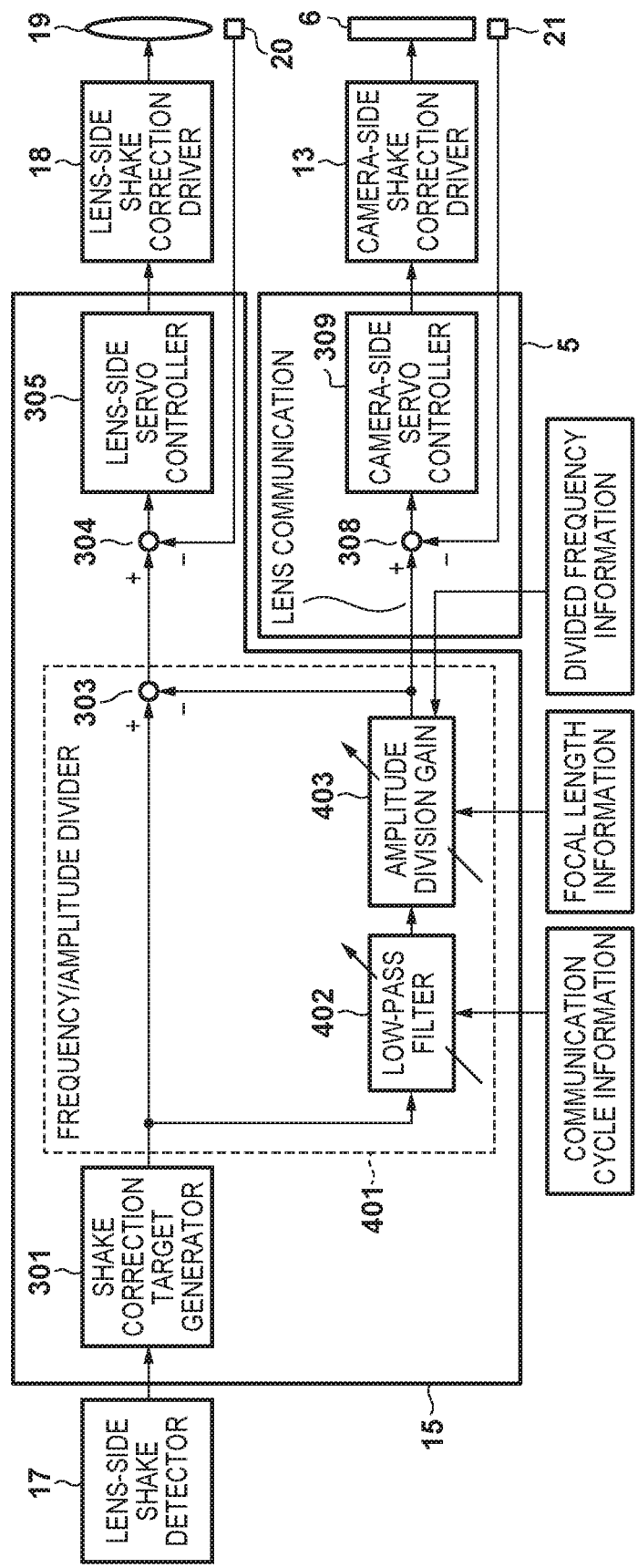
FIGS. 3A and 3B illustrate a configuration of a shake correction system control unit according to the first embodiment of the present invention.
Figure 3B:
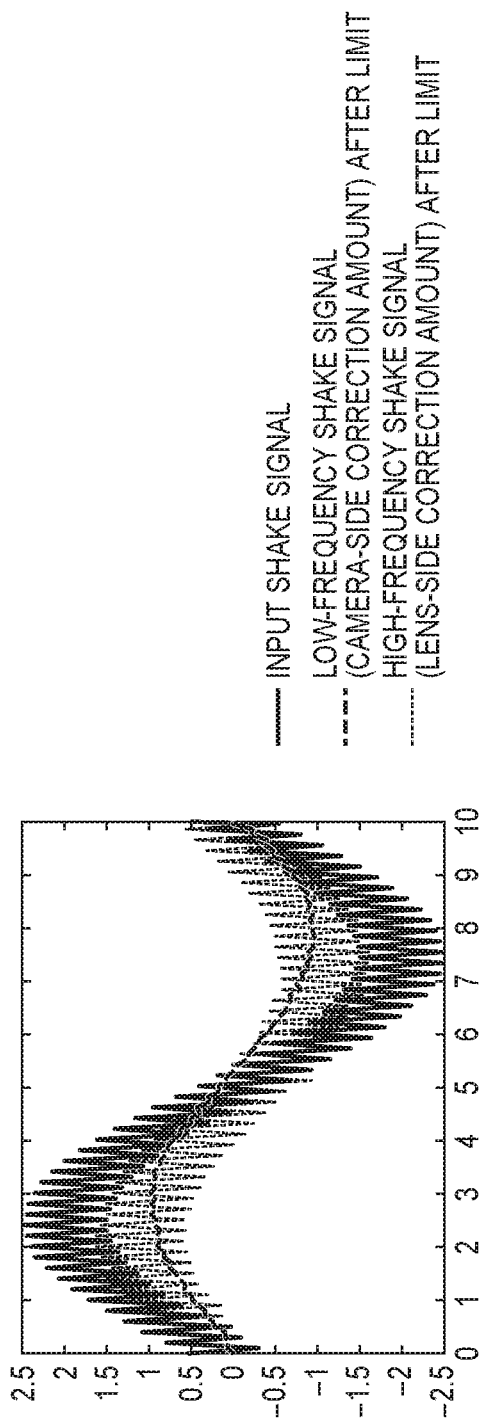

Next, shake correction control according to the first embodiment of the present invention will be described with reference to FIGS. 3A and 3B. FIG. 3A is a block diagram illustrating a configuration of the camera system controller 5 and the lens system controller 15 according to this embodiment, and FIG. 3B illustrates an example of waveforms of shake correction target signals calculated using the technique according to this embodiment.

In FIG. 3A, the lens system controller 15 includes a shake correction target generator 301, a frequency/amplitude divider 401 that is constituted by a low-pass filter 402 with variable cutoff frequency (reference frequency), an amplitude division gain 403 with variable gain (coefficient), and an adder 303, and the lens-side servo controller 305. The camera system controller 5 has the adder 308 and the camera-side servo controller 309.

Next, a description will be given, with reference to the flowcharts in FIGS. 4 and 5, of a shake correction control operation in the camera system according to this embodiment that is configured as described above. In the following description, the lens-side shake correction driver 18 and the camera-side shake correction driver 13 are driven based on a shake signal detected by the lens-side shake detector 17 that is provided on the lens side, of the shake detectors 17 and 12 that are on the lens unit 2 side and the camera body 1 side, respectively. In this case, since shake signal information detected by the lens-side shake detector 17 needs to be transmitted to the camera body 1 side, the information is received and delivered through communication via the electrical contact 14, with the lens unit 2 side acting as the sender side and the camera body 1 side acting as the receiver side.

FIG. 4 is a shake correction sequence performed in the lens unit. In FIG. 4, processing in step S2 and subsequent steps is repeatedly performed in a fixed cycle. Step S1 is a step indicating a start of operation, and means notification of powering on of the camera body 1, for example.

In step S2, the turning off of the power supply is monitored, and if an operation to turn off the power supply has been made to the camera-side operating portion 9, the processing proceeds to step S17 to stop the operation. If the power supply has not been turned off, the processing proceeds to step S3.

In step S3, the turning off of an image stabilization function (IS: Image Stabilization) is detected. If a setting to turn off the image stabilization function has been made to the operating portion 9, the processing proceeds to step S17 to stop the operation. If the image stabilization function has not been turned off, the processing proceeds to step S4.

In step S4, the amount of camera shake is acquired by the lens-side shake detector 17. After the shake amount has been acquired, in step S5, a shake correction target value (shake signal) is calculated by the shake correction target generator 301.

In step S6, the cutoff frequency, which is variable depending on later-described conditions, of the low-pass filter 402 is acquired, and in step S7, the division gain of the amplitude division gain 403 is acquired.

In step S8, in the frequency/amplitude divider 401, a shake correction signal in a low-frequency band (hereinafter, "low-frequency shake correction signal") is extracted from the shake correction target value (correction information) by the low-pass filter 402. In step S9, the division gain acquired in step S7 is integrated with the low-frequency shake correction signal by the amplitude division gain 403, thereby changing the amplitude of the low-frequency shake correction signal. Thus, a first shake correction signal, which is a predetermined amplitude ratio of the low-frequency shake correction signal, is calculated based on the low-frequency shake correction signal.

In step S10, the first shake correction signal calculated in step S9 is subtracted from the shake correction target value by the adder 303, thereby generating a second shake correction signal, which corresponds to the sum of the remaining amplitude ratio of the low-frequency shake and the high-frequency shake. Since the first shake correction signal is based on a change in the amplitude through integration of the gain, a change in the gain also changes the second shake correction signal. In other words, the second shake correction signal is generated based on the shake correction target value and the change in the amplitude of the low-frequency shake correction signal. In step S11, whether or not a predetermined specific lens communication cycle timing has been reached is monitored. The processing proceeds to step S12 if the communication timing has been reached, and proceeds to step S13 if not.

In step S12, the first shake correction signal, which is the low-frequency shake correction signal calculated in step S9, is transmitted to the camera body 1 via the electrical contact 14 through communication. In step S13, the lens position is acquired by the lens position detector 20. In step S14, a signal is calculated by the adder 304 subtracting the lens position information from the second shake correction signal calculated in step S10. In step S15, based on the signal calculated in step S14, a drive signal for driving the lens-side shake correction driver 18 is generated by the lens-side servo controller 305. In step S16, the shake correction unit 19 is driven by the lens-side shake correction driver 18.

Thus, of a shake that is detected by the lens-side shake detector 17, a high-frequency ratio and a certain ratio of a low-frequency shake are corrected by the shake correction unit 19 on the lens unit 2 side.

Figure 5:
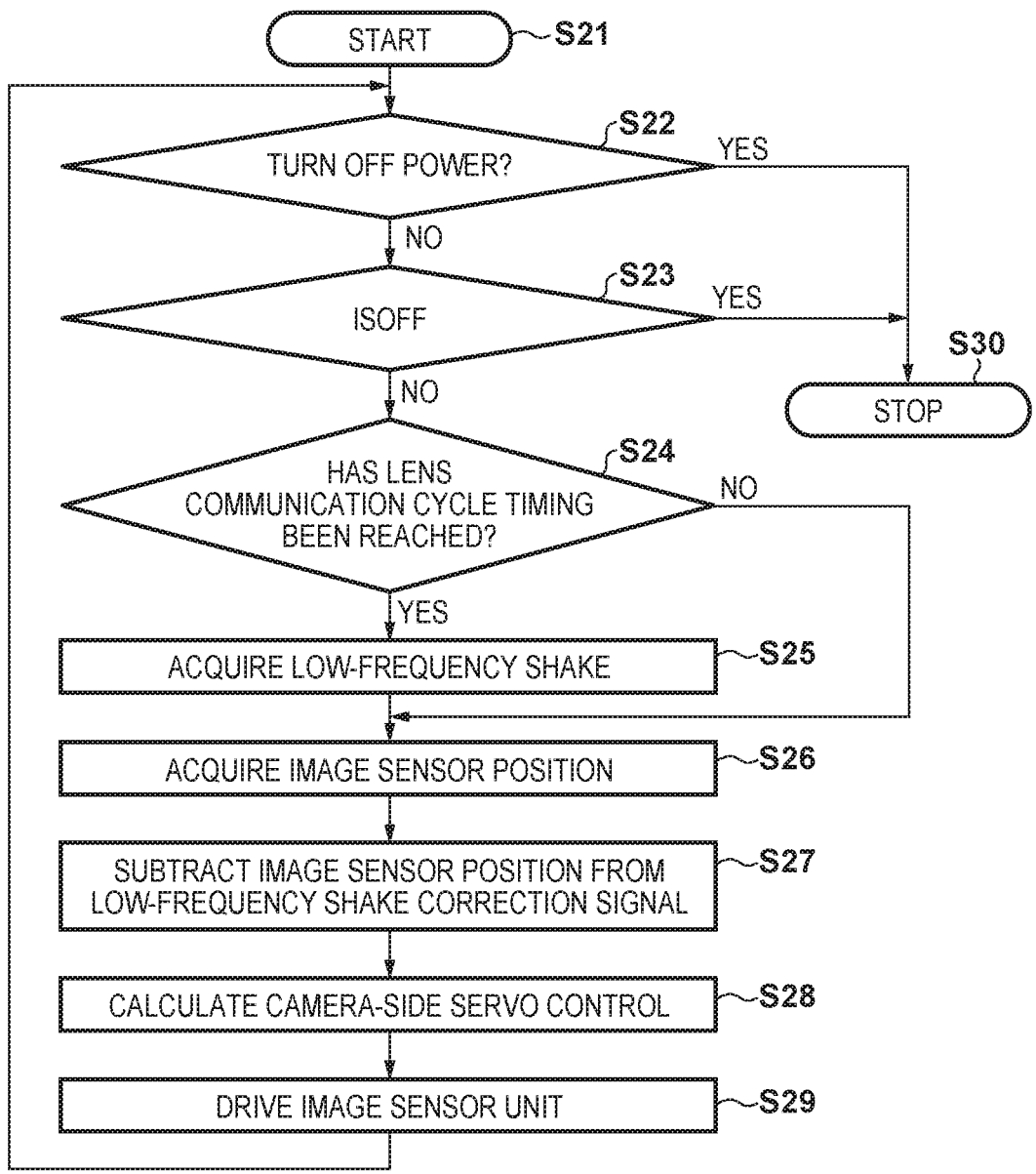
FIG. 5 illustrates a shake correction operation sequence according to the first embodiment.

Meanwhile, on the camera body 1 side, steps S21 to S30 in FIG. 5 are performed in a fixed cycle in parallel with the processing on the lens unit 2 side. Step S21 is a step indicating a start of operation, and means powering on of the camera body 1, for example.

Next, in step S22, the turning off of the power supply is monitored, and the processing proceeds to step S30 to stop the operation if an operation to turn off the power supply has been made to the operating portion 9. If the power supply has not been turned off, the processing proceeds to step S23.

In step S23, the turning off of the image stabilization function is detected. If a setting to turn off the image stabilization function has been made to the operating portion 9, the processing proceeds to step S30 to stop the operation. If the image stabilization function has not been turned off, the processing proceeds to step S24.

In step S24, a lens communication cycle timing is detected. The camera body 1 and the lens unit 2 communicate with each other in a predetermined cycle, e.g. every 16.6 msec (approx. 60 Hz). The faster the communication cycle, the shorter the time delay in shake information transmitted from the camera body 1 to the lens unit 2 can be, but the calculation processing load or the like increases due to the communication. Thus, the communication cycle is determined while giving consideration to these aspects.

In step S24, if the lens communication cycle timing has been reached, the processing proceeds to step S25, and the first shake correction signal, which is a low-frequency shake correction signal transmitted from the lens unit 2 side, is acquired. If the lens communication cycle timing has not been reached, the value of the low-frequency shake correction signal that was obtained during the previous communication is held, and the processing proceeds to step S26.

In step S26, the position of the image sensor is acquired by the image sensor position detector 21. In step S27, image sensor position information acquired in step S26 is subtracted from the low-frequency shake correction signal acquired in step S25 by the adder 308. In step S28, a drive signal for driving the camera-side shake correction driver 13 is generated by the camera-side servo controller 309, based on the signal obtained in step S27. In step S29, the image sensor unit 6 is driven by the camera-side shake correction driver 13, and the image sensor is moved within a plane perpendicular to the optical axis 4. Thus, a certain ratio of a low-frequency shake in a shake detected by the lens-side shake detector 17 is corrected.

Next, effects of this embodiment will be described using FIG. 3B. FIG. 3B illustrates an example of waveforms of the shake correction target signal calculated using the technique according to this embodiment. In FIG. 3B, the solid line indicates an input shake signal before being subjected to frequency and amplitude division that is calculated using the technique according to this embodiment, the dotted line indicates a waveform of the shake correction amount on the camera body side 1 side, and the thin dotted line indicates a waveform of the shake correction amount on the lens unit 2 side. This example assumes the same conditions as those in FIG. 2B.

According to the conventional technique, since the driving amounts of the respective correction means on the lens unit 2 side and the camera body 1 side are generated by means of simple frequency division, the strokes of the respective correction means are not fully utilized, resulting in a decrease in shake correction performance. In this embodiment, after a shake has been subjected to frequency division as with the conventional technique, a predetermined amount of low-frequency components that cannot be fully handled with the maximum stroke of the image sensor unit 6 is further allocated to the shake correction unit 19 that deals with a high-frequency shake signal (thin dotted line) and still has driving stroke availability. Thus, the strokes of the respective correction means can be fully utilized, and the shake correction performance can be improved by preventing a mechanical stroke end from being reached.

The lens-side shake correction driver 18 is driven based on high-frequency components and a predetermined ratio of low-frequency components of a detected shake, and the camera-side shake correction driver 13 is driven based on the predetermined remaining ratio of low-frequency components of the shake. The correction range can be expanded by thus having the camera body 1 and the lens unit 2 separately perform shake correction based on frequency and amplitude.

Figure 6A:
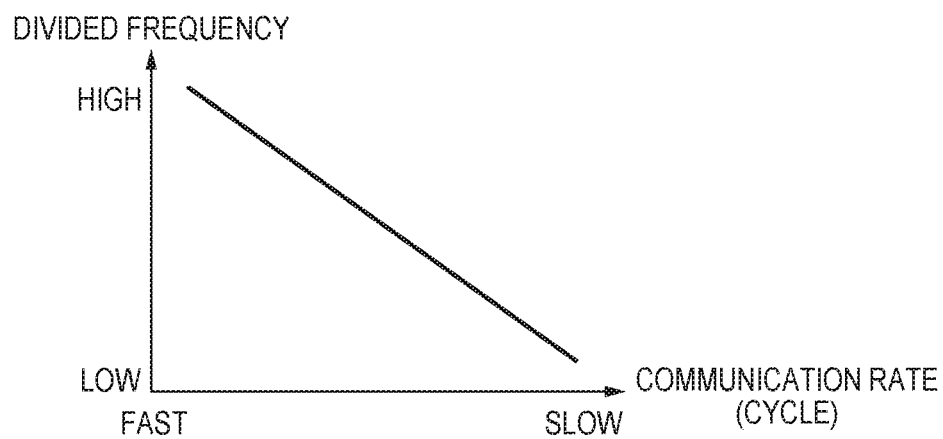
FIGS. 6A to 6C illustrate characteristics of a frequency/amplitude division unit according to the first embodiment.
Figure 6B:
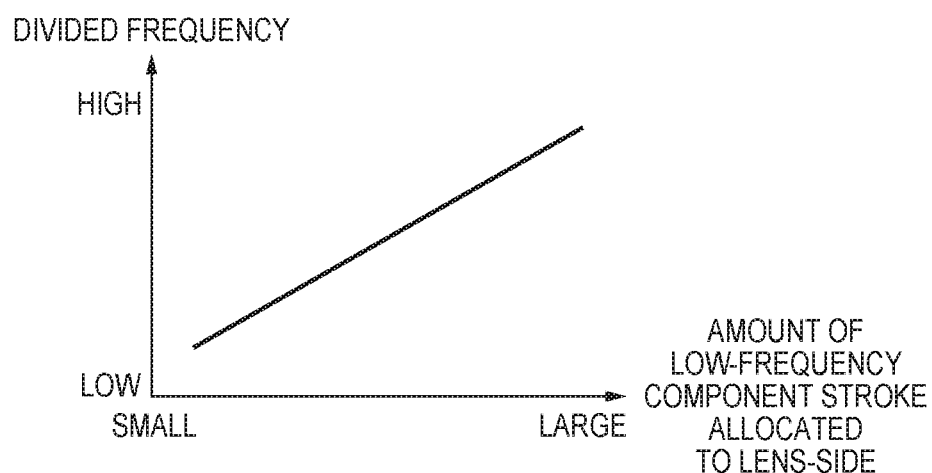
Figure 6C:
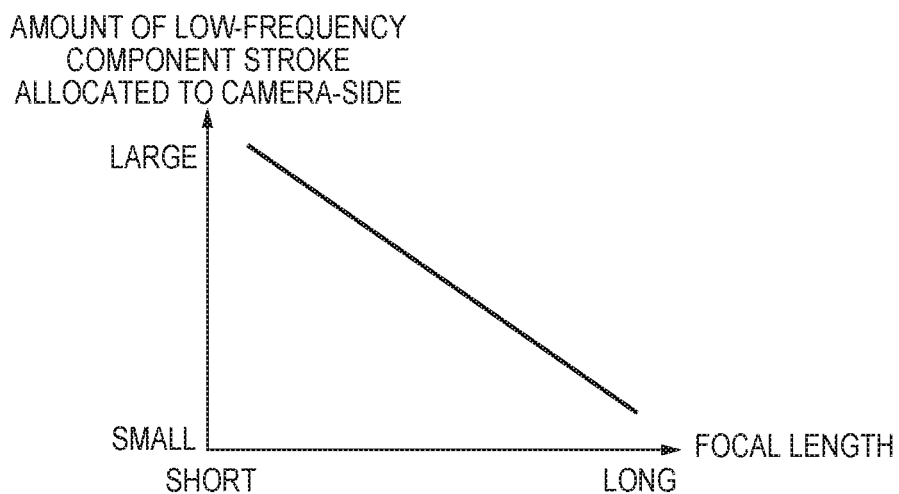

Next, a description will be given, using FIGS. 6A to 6C, of a setting of the cutoff frequency of the low-pass filter 402 for frequency division in step S6, and a setting of the amplitude division gain 403 in step S7. FIGS. 6A to 6C illustrate a relationship between shooting conditions and settings of the low-pass filter and the amplitude divider in the frequency/amplitude divider 401 according to this embodiment. Settings under respective conditions will be described in order.

Relationship Between Lens Communication Cycle and Cutoff Frequency of Low-Pass Filter 402

In this embodiment, the cutoff frequency is acquired based on the lens communication cycle.

In FIG. 6A, the horizontal axis indicates the lens communication cycle, and the vertical axis indicates the cutoff frequency of the low-pass filter 402. In this embodiment, the faster (shorter) the lens communication cycle, the higher the cutoff frequency of the low-pass filter 402 for frequency division is set. This is because, if the lens communication cycle is fast, the time delay in communication to transmit the shake correction amount from the lens unit 2 to the camera body 1 is small, and the influence of a phase delay exerted on high-frequency components due to a communication delay is alleviated even if the camera body 1 side deals with a high-frequency shake signal. This means making the configuration of shake correction closer to a configuration using only simple amplitude division, and is advantageous in that the strokes can be more efficiently assigned for shake correction regardless of frequency components included in a detected shake. Although FIG. 6A shows an example in which the cutoff frequency and the lens communication cycle are in a proportional relationship, the cutoff frequency need only be high when the lens communication cycle is fast, and for example, a mode may alternatively be employed in which the cutoff frequency increases stepwise as the lens communication cycle shortens.

Relationship Between Amount of Low-Frequency Components Allocated to Lens Side and Cutoff Frequency of Low-Pass Filter 402

In this embodiment, the division gain is acquired based on the cutoff frequency acquired in step SC. In FIG. 6B, the vertical axis indicates the cutoff frequency of the low-pass filter 402, and the horizontal axis indicates the amount of low-frequency components allocated to the lens side. In this embodiment, the higher the cutoff frequency of the low-pass filter 402, the higher the amount of low-frequency components to be allocated, by the amplitude division gain 403, to the interchangeable-lens side, of the low-frequency components divided by the low-pass filter 402. This is because, as a result of increasing the cutoff frequency of the low-pass filter 402, the driving stroke availability of the correction means (on the lens unit 2 side in this embodiment) that deals with high-frequency components increases. That is to say, in order to efficiently utilize the respective driving stroke, more low-frequency components are allocated to the side (lens unit 2 side) on which more of a stroke is available as a result of increasing the cutoff frequency. To increase the amount of low-frequency components allocated to the interchangeable-lens side, the division gain used when calculating the first shake correction amount can be reduced.

Although FIG. 6B illustrates an example in which the cutoff frequency and the allocation amount are in a proportional relationship, the allocation amount need only be large when the cutoff frequency is high, and for example, a mode may alternatively be employed in which the allocation amount increases stepwise as the cutoff frequency is increased.

Relationship Between Focal Length and Amount of Low-Frequency Components Allocated to Camera Body Side In another example of this embodiment, the division gain is acquired based on the focal length.

In FIG. 6C, the horizontal axis indicates the focal length, and the vertical axis indicates the amount of low-frequency components allocated to the camera body 1 side after frequency division. In this embodiment, the shorter the focal length acquired from the focal length changer 22, the larger the amount of low-frequency components subjected to frequency division allocated to the stroke on the camera body 1 side. This is because, usually, when the focal length is shorter, the correction angle relative to the stroke of the image sensor unit 6 is larger than when the focal length is longer, and thus, the driving stroke of the image sensor unit 6 can be used more efficiently.

Although FIG. 6C shows an example in which the focal length and the allocation amount are in a proportional relationship, the allocation amount need only be large when the focal length is short, and for example, a mode may alternatively be employed in which the allocation amount increases stepwise as the focal length shortens.

The division gain may also be acquired based on both the focal length and the cutoff frequency. In this case, a configuration may be employed in which the amount of low-frequency components subjected to frequency division allocated to the stroke on the camera body 1 side is smaller when the cutoff frequency of the low-pass filter is higher and the focal length is shorter than when the cutoff frequency is lower and the focal length is shorter, and the allocation amount is yet smaller when the cutoff frequency is lower and the focal length is longer, and is yet smaller when the cutoff frequency is higher and the focal length is longer.

As described above, according to this embodiment, the correction strokes of both the lens-side shake correction driver 18 and the camera-side shake correction driver 13 can be efficiently used by assigning a correction amount thereto in accordance with the communication cycle, frequency, focal length, or the like.

Although this embodiment has described a mode in which the lens unit 2 is the sender side, and the lens unit acquires the first and second shake correction signals using the detection result from the shake detector 17 in the lens unit 2, the camera body 1 may alternatively be the sender side. In this case, the camera system controller 5 acquires the first and second shake correction signals using the detection result from the camera-side shake detector 12. The method for acquiring the first and second shake correction signals is similar to the acquisition method in the lens system controller 15, and a shake can be corrected in accordance with a flow in which steps S13 to S16 in FIG. 4 are replaced with steps S26 to S29 in FIG. 5. This embodiment has described a mode in which a target value corresponding to the entire frequency band to be subjected to shake correction is first generated by the shake correction target generator 301 using the detection result from the lens-side shake detector 17, and thereafter, frequency division and amplitude division are performed using the cutoff frequency and the division gain. However, the first and second shake correction signals may be acquired without generating a target value corresponding to the entire frequency band to be subjected to shake correction. For example, a configuration may alternatively be employed in which the detection result from the shake detector is divided into a low-frequency band and a high-frequency band, and a low-frequency shake correction signal and a high-frequency shake correction signal corresponding to a target value are generated based on the respective divided detection results.

Second Embodiment

The second embodiment of the present invention will now be described. In the first embodiment, shake correction is performed using information from the lens-side shake detector 17 by the lens-side shake correction driver 18 and the camera-side shake correction driver 13. In contrast, in the second embodiment, shake correction is performed using shake information from both the lens-side shake detector 17 and the camera-side shake detector 12, by the lens-side shake correction driver 18 and the camera-side shake correction driver 13. Other configurations are the same as those of the first embodiment. Thus, only configurations and processing portions different from those of the first embodiment will be described, and a description of redundant portions is omitted.

Figure 7:
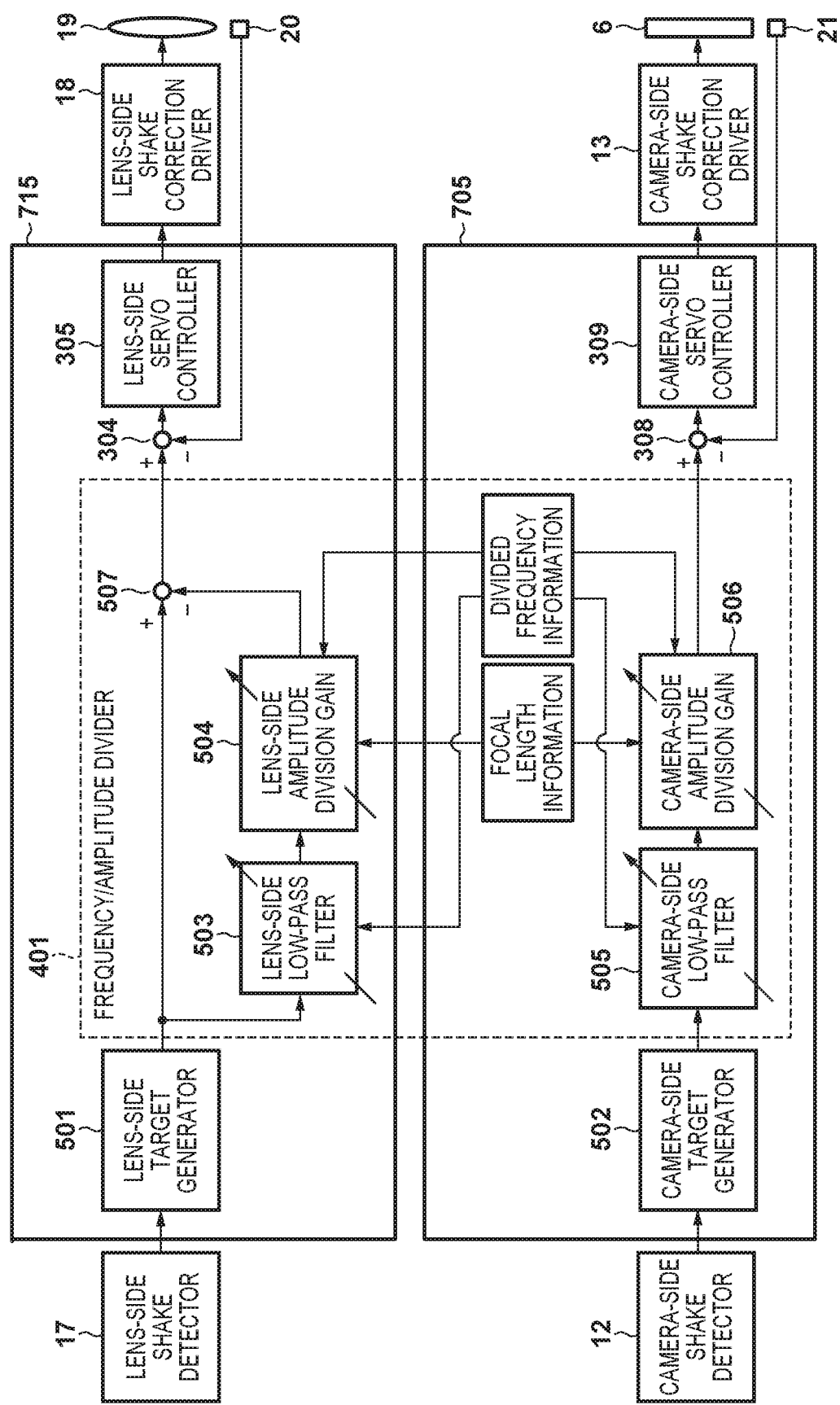
FIG. 7 illustrates a configuration of a shake correction system control unit according to a second embodiment.

FIG. 7 is a block diagram illustrating a configuration of a lens system controller 715 and a camera system controller 705 according to the second embodiment.

In FIG. 7, the lens system controller 715 includes a lens-side target generator 501, a lens-side low-pass filter 503, a lens-side amplitude division gain 504, an adder 507, the adder 304, and the lens-side servo controller 305. The camera system controller 705 includes a camera-side target generator 502, a camera-side low-pass filter 505, a camera-side amplitude division gain 506, the adder 308, and the camera-side servo controller 309. The lens-side low-pass filter 503, the lens-side amplitude division gain 504, the adder 507, the camera-side low-pass filter 505, and the camera-side amplitude division gain 506 constitute the frequency/amplitude divider 401.

Figure 8:
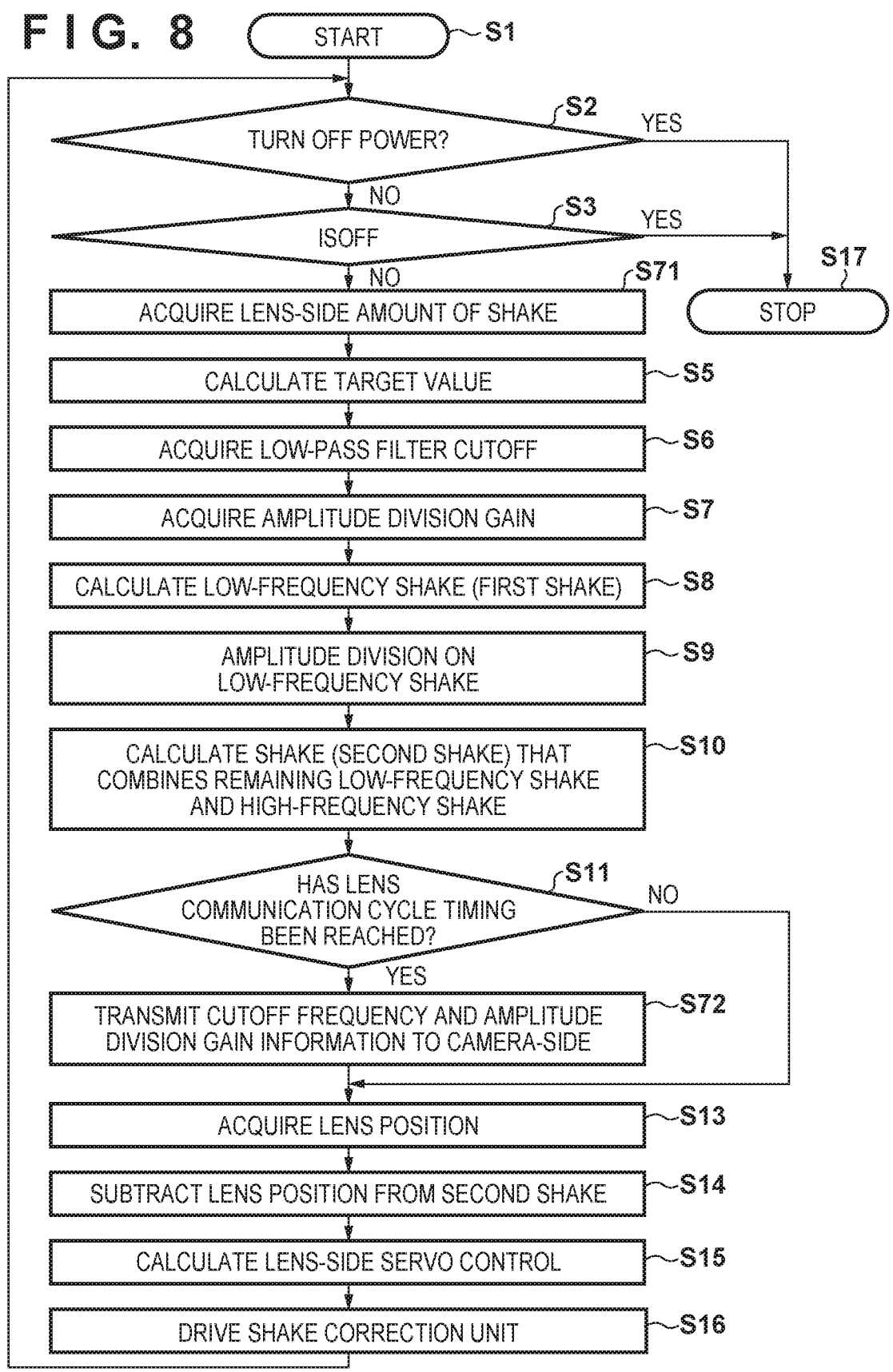
FIG. 8 illustrates a shake correction operation sequence according to the second embodiment.

Next, a description will be given, with reference to the flowchart in FIG. 8, of a shake correction control operation in the camera system that is configured as described above. In the following description, the lens-side shake correction driver 18 and the camera-side shake correction driver 13 are driven based on shake information from both the shake detectors 17 and 12 that are provided respectively on the lens unit 2 side and the camera body 1 side. Since many other features are shared with the first embodiment, only the features different from those shown in FIGS. 4 and 5 will be described. Note that information regarding the cutoff frequency of the lens-side low-pass filter 503 and setting information (characteristics informations regarding the lens-side amplitude division gain 504 need to be transmitted to the camera body 1. For this reason, the information is received and delivered through communication via the electrical contact 14, with the lens unit 2 side acting as the sender side and the camera body 1 side acting as the receiver side. In FIG. 8, processing in step S2 and subsequent steps is repeatedly performed in a fixed cycle.

In step S71, the amount of camera shake is acquired by the lens-side shake detector 17. After the shake amount has been acquired, in step S5, a shake correction target value is calculated by the lens-side target generator 501.

In steps S6 and S7, the cutoff frequency of the lens-side low-pass filter 503 and the division gain of the lens-side amplitude division gain 504 are acquired using a method similar to that of the first embodiment.

In step S8, a low-frequency shake correction signal is extracted from the shake correction target value by the lens-side low-pass filter 503. In step S9, a predetermined gain is integrated with the low-frequency shake correction signal by the lens-side amplitude division gain 504, thereby calculating a specific amplitude ratio of the low-frequency shake correction signal based on the low-frequency shake correction signal.

In step S10, the specific amplitude ratio of the low-frequency shake correction signal is subtracted from the shake correction signal by the adder 507, thereby generating a high-frequency shake correction signal, which corresponds to the sum of a predetermined amplitude ratio of low-frequency shake and a high-frequency shake.

In step S11, lens communication that occurs at predetermined timings is monitored. The processing proceeds to step S72 if a communication timing has been reached, and proceeds to step S13 if not. Unlike in the first embodiment, the lens communication does not occur in a predetermined cycle, but is performed asynchronously when information needs to be received and delivered.

In step S72, information (characteristics information) regarding the lens-side low-pass filter 503 and the lens-side amplitude division gain 504 is transmitted to the camera body 1 through communication via the electrical contact 14. This is because the characteristics of the cutoff frequency of the low-pass filter and the amplitude division gain on the lens side and the camera side, which are set in accordance with focal length information and divided frequency information, need to be the same, similarly to the first embodiment. As a result of this processing, a later-described allocation ratio between the shake correction amount on the camera body 1 side and the correction amount on the lens unit 2 side is set appropriately.

Figure 9:
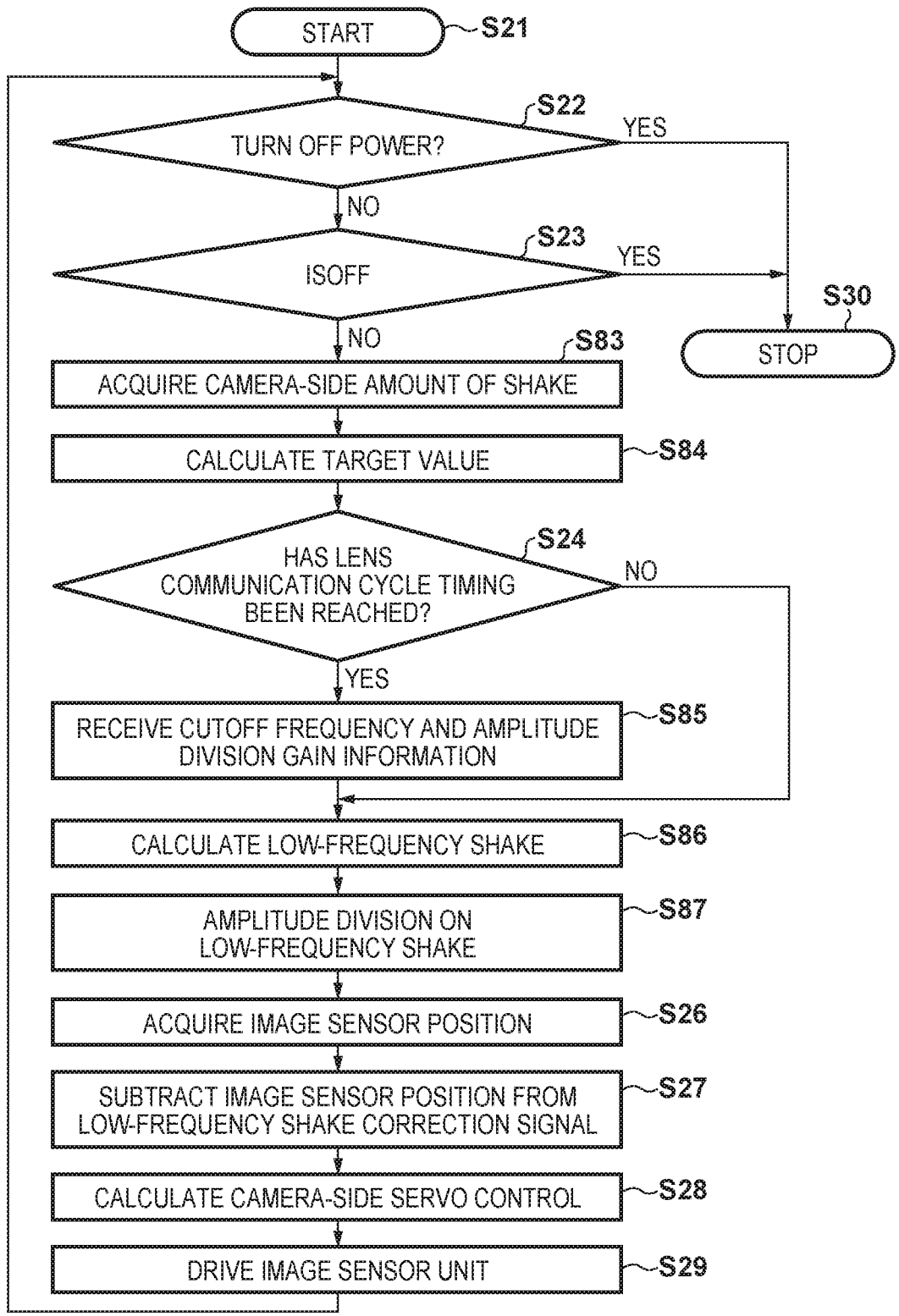
FIG. 9 illustrates a shake correction operation sequence according to the second embodiment.

Next, processing on the camera body 1 side will be described with reference to FIG. 9. In step S83, the amount of camera shake is acquired by the camera-side shake detector 12. After the shake amount has been acquired, in step S84, a shake correction target value is calculated by the camera-side target generator 502.

In step S24, lens communication that occurs at predetermined timings is monitored. The processing proceeds to step S85 if a communication timing has been reached, and proceeds to step S86 if not.

In step S85, the cutoff frequency of the low-pass filter and the amplitude division gain on the lens side that are transmitted from the lens unit 2 are received, and are set, respectively, to the camera-side low-pass filter 505 and the camera-side amplitude division gain 506.

In step S86, a low-frequency shake correction signal is extracted by the camera-side low-pass filter 505. In step S87, a predetermined gain is integrated with the low-frequency shake correction signal by the camera-side amplitude division gain 506, thereby calculating a specific amplitude ratio of the low-frequency shake correction signal based on the low-frequency shake correction signal. The camera-side shake correction driver 13 is driven based on the low-frequency shake correction signal that is calculated as described above, and shake correction is performed.

As described above, the lens-side shake correction driver 18 is driven based on high-frequency components and a predetermined ratio of low-frequency components of a shake detected by the lens-side shake detector 17. Also, the camera-side shake correction driver 13 is driven based on a predetermined ratio of low-frequency components of a shake detected by the camera-side shake detector 12. By thus driving the correction means to perform shake correction based on signals from the lens-side and camera-side shake detectors, respectively, the frequency of communication between the camera body and the lens unit can be reduced. In addition, since high-speed communication is not needed, the correction range of the correction means on the camera body side and the lens unit side can be readily expanded. Although this embodiment has described a mode in which the lens unit 2 is on the sender side, and the lens unit acquires the first and second shake correction signals using the detection result from the shake detector 17 in the lens unit 2, the camera body 1 may be on the sender side, similarly to the first embodiment.

Third Embodiment

The third embodiment of the present invention will be described with reference to FIG. 10. Since many features of the third embodiment are also shared with the first embodiment, only the features different from the first embodiment will be described.

Figure 10:
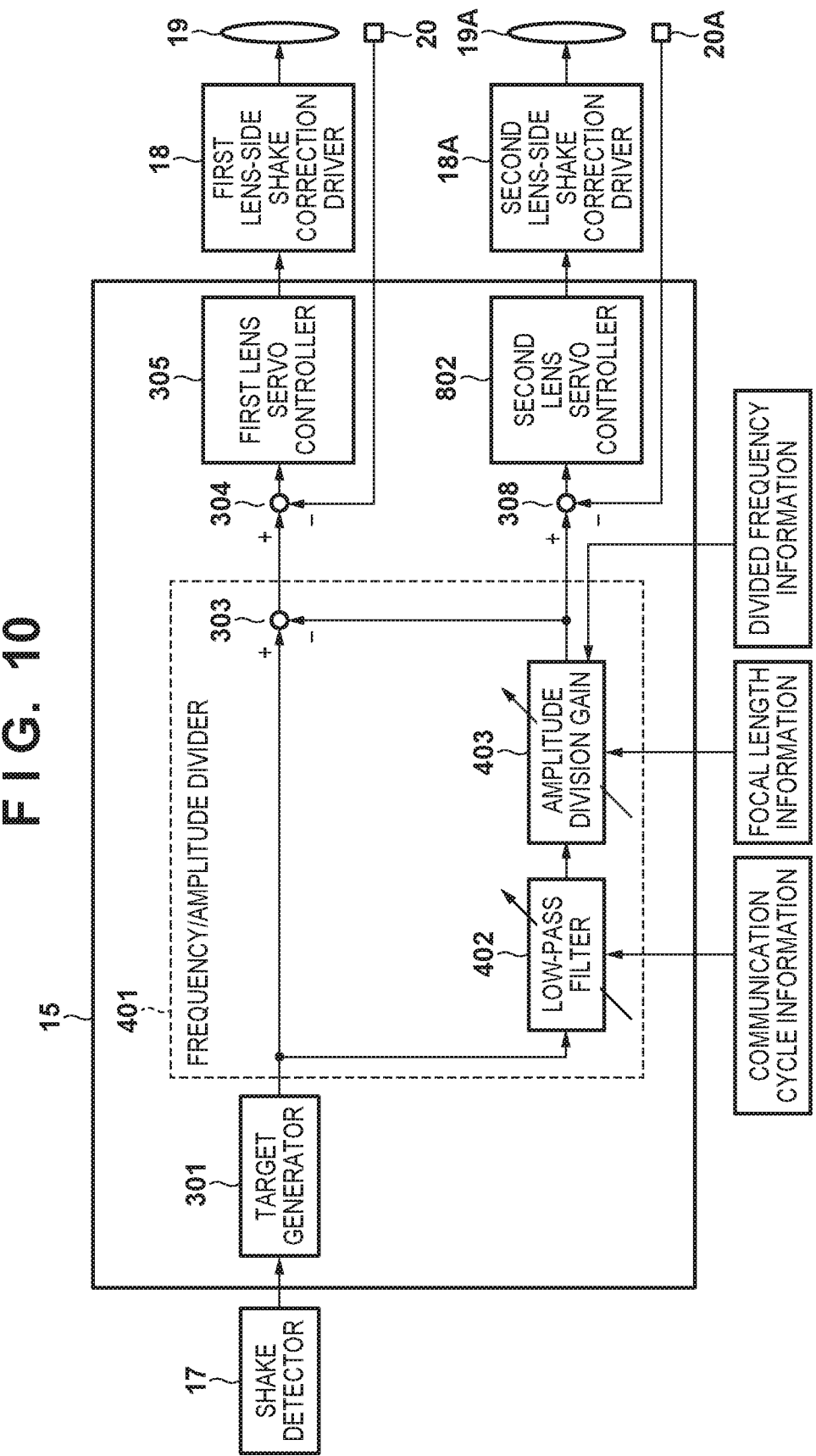
FIG. 10 illustrates a configuration of a shake correction system control unit according to a third embodiment.

In FIG. 10, a lens unit according to the third embodiment has a second shake correction unit 19A, which is a lens arranged in the imaging optical system 3, in addition to the first shake correction unit 19 and the first lens-side shake correction driver 18 that drives the first shake correction unit 19 in the first embodiment. The second shake correction unit 19A is driven by a second lens servo controller 802 controlling a second lens-side shake correction driver 18A. The position of the second lens shake correction unit 19A is detected by a second lens position detector 20A.

In the first and second embodiments, the lens unit 2 has the lens-side shake correction driver 18, and the camera body 1 has the camera-side shake correction driver 13. The respective correction means are driven in conjunction with each other by the lens unit 2 and the camera body 1 communicating information with each other, and the correction range is thus expanded. In contrast, this embodiment is an example of the case where either the camera body or the lens unit has a plurality of shake correction means. In this embodiment, a plurality of lens-side shake correction drivers 18 and 18A are provided as shown in FIG. 10.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-020332, filed Feb. 7, 2018, which is hereby incorporated by reference herein in its entirety.

What is claimed is:

1. An image stabilization apparatus for correcting an image blur in an image capturing apparatus, the image stabilization apparatus comprising:
  a shake detector configured to detect an image blur;
  a processor; and a memory holding a program which makes the processor function as:
  a generation unit configured to generate a first shake correction signal and a second shake correction signal based on a shake signal corresponding to a detection result from the shake detector, the generation unit extracting a first frequency band signal from the shake signal, changing an amplitude of the extracted first frequency band signal to generate the first shake correction signal, and generating the second shake correction signal based on the change in the amplitude of the extracted first-frequency band signal and the shake signal;
  a first shake correction unit configured to correct the image blur based on the first shake correction signal; and
  a transmission unit configured to transmit the second shake correction signal to a second image stabilization apparatus,
  wherein the first shake correction signal includes a portion of the amplitude of the first-frequency band signal included in the shake signal, and the second shake correction signal includes a remaining portion of the amplitude of the first-frequency band signal and a second-frequency band signal included in the shake signal, and
  wherein frequency of the second-frequency band is higher than frequency of the first frequency band.

2. The image stabilization apparatus according to claim 1, wherein the generation unit divides the shake signal into the first frequency band signal and the second frequency band signal based on a reference frequency.

3. The image stabilization apparatus according to claim 2, wherein, when a transmission frequency at which the first shake correction signal is transmitted to the image capturing apparatus takes a first value, the generation unit makes the reference frequency higher than when the transmission frequency takes a second value that is lower than the first value.

4. The image stabilization apparatus according to claim 2, wherein, when the reference frequency is a first frequency, the generation unit allocates a greater amplitude of the first frequency band signal to the second shake correction signal than when the reference frequency is a second frequency that is lower than the first frequency.

5. The image stabilization apparatus according to claim 1, wherein, when a focal length of the image capturing apparatus is a first length, the generation unit allocates a greater amplitude of the first frequency band signal to the first shake correction signal than when the focal length is a second length that is longer than the first length.

6. The image stabilization apparatus according to claim 1, wherein the generation unit generates the second shake correction signal by subtracting the first shake correction signal from the shake signal.

7. The image stabilization apparatus according to claim 1, wherein the first shake correction unit includes a mechanism for moving an image sensor arranged in the image capturing apparatus, on a flat plane perpendicular to an optical axis.

8. The image stabilization apparatus according to claim 1, wherein the first shake correction unit includes a mechanism for moving at least one lens of lenses that constitutes an imaging optical system, on a flat plane perpendicular to an optical axis.

9. The image stabilization apparatus according to claim 1, wherein the generation unit changes the amplitude of the extracted fist-frequency band signal by multiplying a gain to the extracted first-frequency band signal and generates the second shake correction signal based on the gain, the extracted first-frequency band signal and the second-frequency band signal.

10. An image capturing system that includes a lens having an imaging optical system, and an image capturing apparatus to which the lens is removably attached, the image capturing system comprising:
- at least one shake detector configured to detect a shake of the image capturing system;
- a processor; and
- a memory holding a program which makes the processor function as:
- a generation unit configured to generate a first shake correction signal and a second shake correction signal based on a shake signal corresponding to a detection result from the at least one shake detector, the generation unit extracting a first frequency band signal from the shake signal, changing an amplitude of the extracted first frequency band signal to generate the first shake correction signal, and generating the second shake correction signal based on the change in the amplitude of the extracted first-frequency band signal and the shake signal; and
- first and second shake correction units configured to correct a shake of an image based respectively on the first and second shake correction signals generated by the generation unit,
- wherein the first shake correction signal includes a portion of the amplitude of the first-frequency band signal included in the shake signal, and the second shake correction signal includes a remaining portion of the amplitude of the first-frequency band signal and a second-frequency band signal included in the shake signal, and
- wherein frequency of the second-frequency band is higher than frequency of the first frequency band.

11. The image capturing system according to claim 10, wherein the first shake correction unit is arranged in the image capturing apparatus, and the second shake correction unit is arranged in the lens.

12. The image capturing system according to claim 10, wherein the second shake correction unit is arranged in the image capturing apparatus, and the first shake correction unit is arranged in the lens.

13. The image capturing system according to claim 10, wherein the first shake correction unit corrects an image blur based on the first shake correction signal, and the second shake correction unit corrects an image blur based on the second shake correction signal.

14. The image capturing system according to claim 10, wherein the at least one shake detector includes a first shake detector arranged in the image capturing apparatus, and a second shake detector arranged in the lens.

15. The image capturing system according to claim 14, wherein the generation unit generates the first shake correction signal based on a shake signal corresponding to a detection result from the first shake detector, and a coefficient, and generates the second shake correction signal based on a shake signal corresponding to a detection result from the second shake detector, and the coefficient.

16. The image capturing system according to claim 10, wherein the first and second shake correction units are arranged in the lens.

17. A method for controlling an image stabilization apparatus comprising:
- detecting a shake;
- generating a first shake correction signal and a second shake correction signal based on a shake signal corresponding to a detection result of the detecting of a shake, wherein a first frequency band signal is extracted from the shake signal, an amplitude of the extracted first frequency band signal is changed to generate the first shake correction signal, and the second shake correction signal is generated based on the change in the amplitude of the extracted first-frequency band signal and the shake signal;
- correcting the image blur based on the second shake correction signal generated during the generating; and
- transmitting the first shake correction signal generated during the generating, to a second image stabilization apparatus,
- wherein the first shake correction signal includes a portion of the amplitude of the first-frequency band signal included in the shake signal, and the second shake correction signal includes a remaining portion of the amplitude of the first-frequency band signal and a second-frequency band signal included in the shake signal, and
- wherein frequency of the second-frequency band is higher than frequency of the first frequency band.

18. A method for controlling an image capturing system that includes a lens having an imaging optical system and an image capturing apparatus to which the lens is removably attached, the method comprising:
- detecting a shake of the image capturing system, using at least one shake detector;
- generating a first shake correction signal and a second shake correction signal based on a shake signal corresponding to a detection result of the detecting of a shake, wherein a first frequency band signal is extracted from the shake signal, an amplitude of the extracted first frequency band signal is changed to generate the first shake correction signal, and the second shake correction signal is generated based on the change in the amplitude of the extracted first-frequency band signal and the shake signal; and
- performing first and second shake correction to correct a shake of an image based respectively on the generated first and second shake correction signals,
- wherein the first shake correction signal includes a portion of the amplitude of the first-frequency band signal included in the shake signal, and the second shake correction signal includes a remaining portion of the amplitude of the first-frequency band signal and a second-frequency band signal included in the shake signal, and
- wherein frequency of the second-frequency band is higher than frequency of the first frequency band.

* * * * *